(12) United States Patent
Mamura et al.

(10) Patent No.: US 10,999,459 B2
(45) Date of Patent: May 4, 2021

(54) IMAGE READING DEVICE AND IMAGE FORMING APPARATUS THAT PERFORM NOTIFICATION PROCESSING FOR NOTIFYING USER THAT SPECIAL ORIGINAL DOCUMENT TO BE READ PREFERABLY AT HIGH RESOLUTION HAS BEEN DETECTED FROM AMONG ORIGINAL DOCUMENTS READ AT LOW RESOLUTION

(71) Applicant: KYOCERA Document Solutions Inc., Osaka (JP)

(72) Inventors: Toshiki Mamura, Osaka (JP); Hiroto Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/002,166

(22) Filed: Aug. 25, 2020

(65) Prior Publication Data

US 2021/0067645 A1 Mar. 4, 2021

(30) Foreign Application Priority Data

Aug. 30, 2019 (JP) .............................. JP2019-158536

(51) Int. Cl.
*H04W 40/00* (2009.01)
*H04N 1/00* (2006.01)

(52) U.S. Cl.
CPC ..... *H04N 1/00708* (2013.01); *H04N 1/00644* (2013.01); *H04N 1/00724* (2013.01); *H04N 1/00726* (2013.01)

(58) Field of Classification Search
CPC .......... H04N 1/00708; H04N 1/00729; H04N 1/00737; H04N 1/00644; H04N 1/00724;
(Continued)

(56) References Cited

U.S. PATENT DOCUMENTS

2010/0231963 A1* 9/2010 Oda .................... H04N 1/00923
358/1.15

FOREIGN PATENT DOCUMENTS

JP 2003-069796 A 3/2003
JP 2003-358507 * 3/2003 ............... H04N 1/21

* cited by examiner

*Primary Examiner* — Moustapha Diaby
(74) *Attorney, Agent, or Firm* — IP Business Solutions, LLC

(57) ABSTRACT

A number-of-documents calculator calculates a number of original documents on a document placement tray from their weight detected by a weight sensor. A controller sets a resolution to a predetermined first resolution when the number of original documents is less than a predetermined number or sets the resolution to a predetermined second resolution lower than the first resolution when the number of original documents is not less than the predetermined number, and allows a document reader to read images of the original documents at the set first or second resolution. A special document detector determines, based on image data on the original document, whether the original document satisfies a predetermined condition, and detects the original document satisfying the condition as a special original document preferably to be read at a third resolution higher than the first resolution. A notifier notifies a user that the special original document has been detected.

7 Claims, 6 Drawing Sheets

(58) Field of Classification Search
CPC ........... H04N 1/00726; H04N 1/00769; H04N 1/00822; H04N 1/00811
See application file for complete search history.

IMAGE READING DEVICE AND IMAGE FORMING APPARATUS THAT PERFORM NOTIFICATION PROCESSING FOR NOTIFYING USER THAT SPECIAL ORIGINAL DOCUMENT TO BE READ PREFERABLY AT HIGH RESOLUTION HAS BEEN DETECTED FROM AMONG ORIGINAL DOCUMENTS READ AT LOW RESOLUTION

INCORPORATION BY REFERENCE

This application claims priority to Japanese Patent Application No. 2019-158536 filed on 30 Aug. 2019, the entire contents of which are incorporated by reference herein.

BACKGROUND

The present disclosure relates to image reading devices and image forming apparatuses and particularly relates to a technique for automatically reading a plurality of original documents.

Methods of placing an original document to be read on an image forming apparatus, such as a copier having a scan function or a multifunction peripheral, include: the method of placing an original document on an original glass (platen glass); and the method of placing an original document on a document feeder called an ADF (auto document feeder). With the use of the document feeder, the image forming apparatus can successively read a plurality of original documents.

SUMMARY

A technique improved over the aforementioned technique is proposed as one aspect of the present disclosure.

An image reading device according to an aspect of the present disclosure includes a document reader, a document feeder, a weight sensor, and a control device. The document reader reads an image of an original document. The document feeder includes a document placement tray on which the original document is to be placed, and feeds the original document placed on the document placement tray to the document reader. The weight sensor detects a weight of a stack of original documents placed on the document placement tray. The control device includes a processor and functions, through the processor executing a control program, as a number-of-documents calculator, a controller, a special document detector, and a notifier. The number-of-documents calculator calculates, based on the weight detected by the weight sensor, a number of the original documents placed on the document placement tray. The controller sets a resolution for reading the original documents to a predetermined first or second resolution based on the number of the original documents calculated by the number-of-documents calculator by setting the resolution to the first resolution when the number of the original documents is less than a predetermined number or setting the resolution to the second resolution lower than the first resolution when the number of the original documents is equal to or more than the predetermined number, and allows the document reader to read the images of the original documents fed by the document feeder at the set first or second resolution. The special document detector determines, based on image data on each of the original documents acquired by reading by the document reader, whether or not the original document satisfies a predetermined condition representing that the original document is to be read preferably at a third resolution higher than the first resolution, and detects the original document satisfying the predetermined condition as a special original document to be read preferably at the third resolution. A notifier performs notification processing for notifying a user that the special original document has been detected by the special document detector.

An image forming apparatus according to another aspect of the present disclosure includes the above-described image reading device and an image forming device. The image forming device forms an image on a recording medium based on the image date acquired by reading by the image reading device.

DETAILED DESCRIPTION

Figure 1:
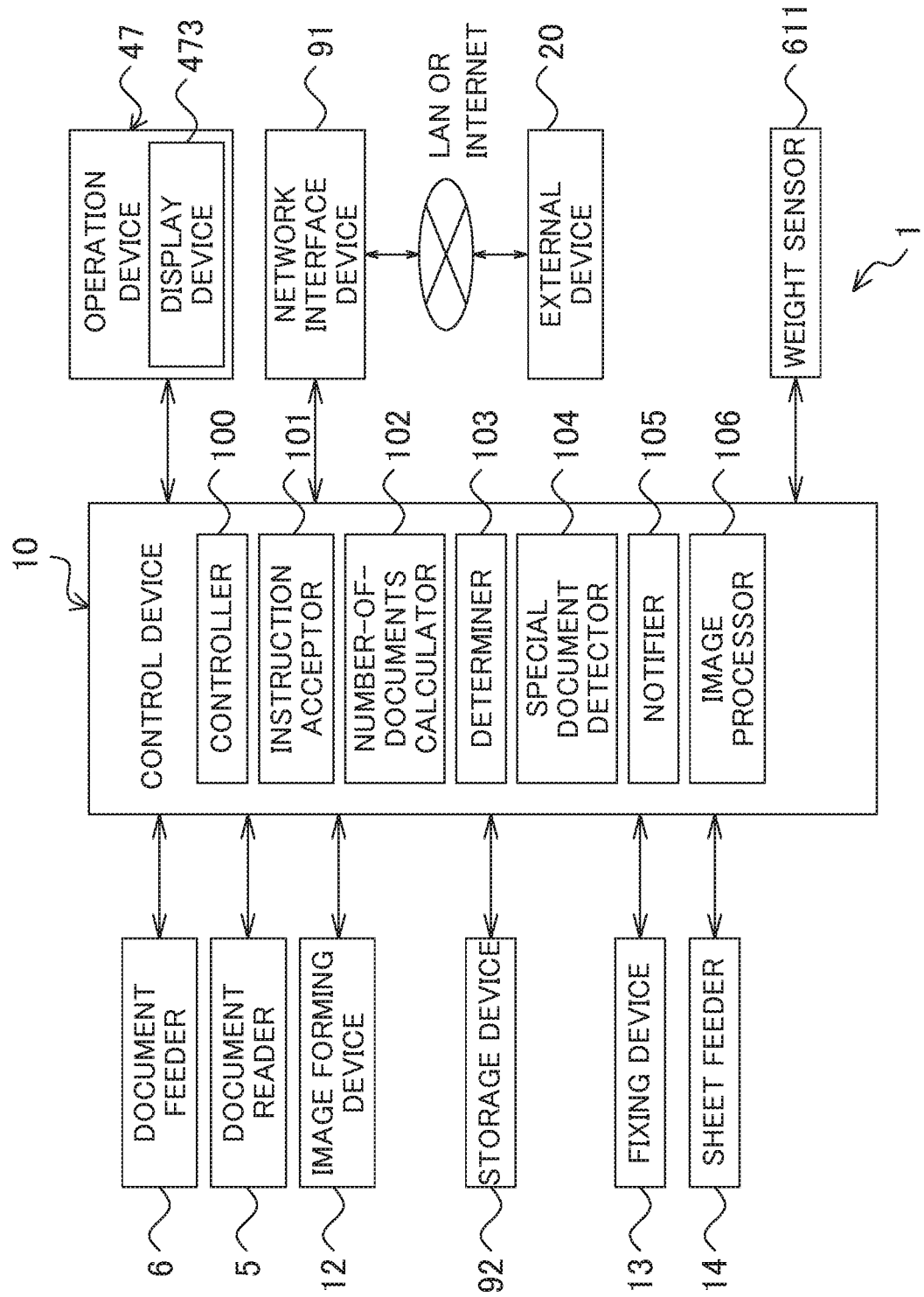
FIG. 1 is a functional block diagram schematically showing an essential internal configuration of an image forming apparatus according to a first embodiment.
Figure 2:
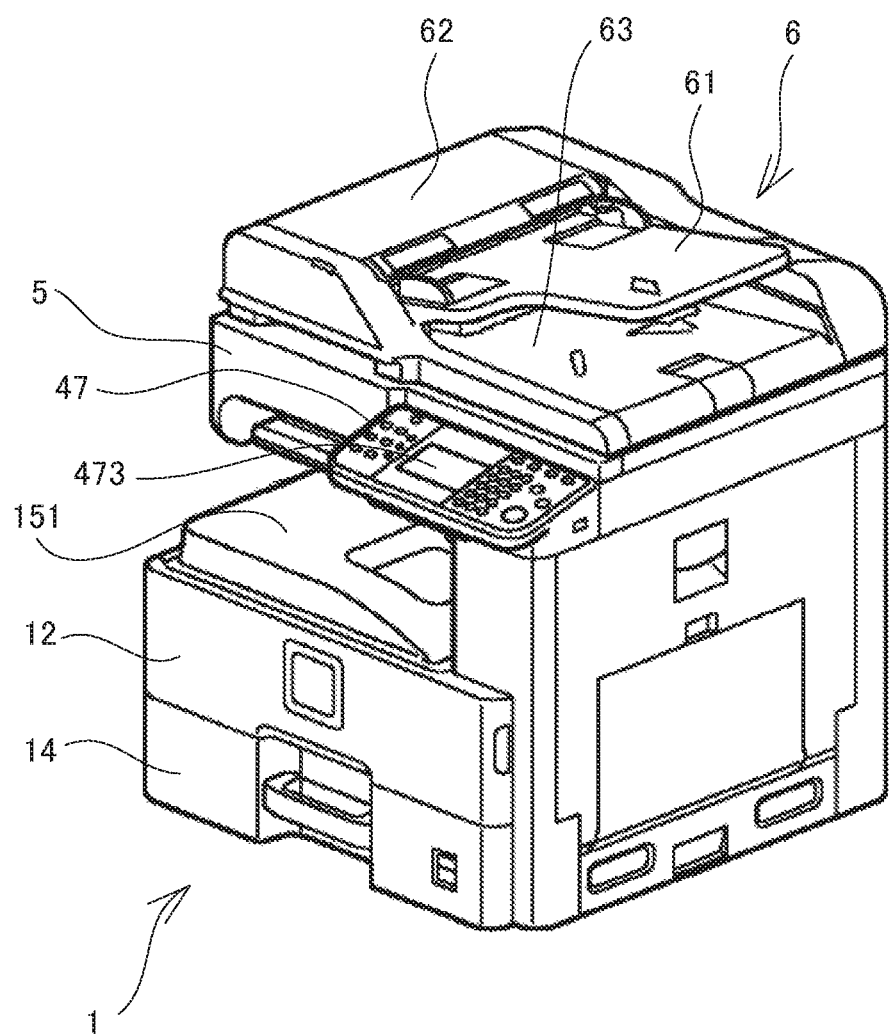
FIG. 2 is a perspective view schematically showing an appearance of the image forming apparatus according to the first embodiment.

Hereinafter, a description will be given of an image reading device and an image forming apparatus according to an embodiment of the present disclosure with reference to the drawings. FIG. 1 is a functional block diagram schematically showing an essential internal configuration of an image forming apparatus which is a first embodiment of an image reading device according to the present disclosure. FIG. 2 is a perspective view schematically showing an appearance of the image forming apparatus according to the first embodiment.

The image forming apparatus 1 is a multifunction peripheral having multiple functions including, for example, a copy function, a print function, a scan function, and a facsimile function. The image forming apparatus 1 is made up by including a control device 10, a document feeder 6, a document reader 5, an image forming device 12, a fixing device 13, a sheet feeder 14, an operation device 47, a network interface device 91, a storage device 92, and a weight sensor 611.

The document feeder 6 is mounted by hinges or the like on a top surface of the document reader 5 and is thus openable and closable to the top surface of the document reader 5. The document feeder 6 functions as a document holder cover during reading of an original document placed on the platen glass.

The document feeder 6 is an ADF (auto document feeder). The document feeder 6 is made up by including: a document placement tray 61 on which one or more original documents are to be placed; a housing 62 containing a feeding mechanism that feeds the original documents on the document placement tray 61 to the document reader 5; and a document discharge tray 63 that receives the original documents of which images have been read by the document reader 5 and which have been then discharged from the housing 62. The document feeder 6 is an example of a document feeder defined in What is claimed is.

A description will be given below of the case where an original document reading operation is performed on the image forming apparatus 1. The document reader 5 optically reads an image of an original document fed to the document reader 5 by the document feeder 6 or an image of an original document placed on the platen glass and generates image data from the read image. The image data generated by the document reader 5 is saved in an image memory or the like.

Next, a description will be given of the case where an image forming operation is performed on the image forming apparatus 1. The image forming device 12 forms a toner image on a recording paper sheet fed from the sheet feeder 14 and serving as a recording medium, based on image data generated by the original document reading operation, image data stored in the image memory or the like, image data received from a network-connected computer, or other types of image data.

The fixing device 13 applies heat and pressure to the recording paper sheet on which the toner image has been formed by the image forming device 12, thus fixing the toner image on the recording paper sheet. The recording paper sheet subjected to this fixation processing is discharged to a sheet output tray 151.

The operation device 47 accepts input of operators' instructions for various types of operations and processing executable by the image forming apparatus 1, such as an instruction to execute an image forming operation. The operation device 47 includes a display device 473 that displays operation guidance and other types of information for the operators.

The display device 473 includes a touch panel. The operators can operate the image forming apparatus 1 with the touch of buttons or keys displayed on the display device 473.

The network interface device 91 transfers various data to and from external devices on a LAN or the Internet.

The storage device 92 is an HDD (hard disk drive), an SSD (solid state drive) or the like and stores various operation programs, image data, and so on.

The weight sensor 611 is provided in the document placement tray 61 and detects the weight of a stack of original documents placed on the document placement tray 61. The weight sensor 611 is electrically connected to the control device 10. The detection result of the weight sensor 611 is transmitted to and acquired by the control device 10.

The weight sensor 611 is provided with an on/off switch. The switch is formed switchably by an electric signal from an optical sensor that turns on or off depending on the presence or absence of at least one original document on the document placement tray 61.

The control device 10 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit).

When the above processor operates in accordance with a control program stored on the storage device 92 or the like, the control device 10 functions as a controller 100, an instruction acceptor 101, a number-of-documents calculator 102, a determiner 103, a special document detector 104, a notifier 105, and an image processor 106. Alternatively, each of the controller 100 and the other components of the control device 10 may not be implemented by the operation of the processor in accordance with the control program, but may be constituted by a hardware circuit. Hereinafter, the same applies to the other embodiments unless otherwise stated.

The controller 100 governs the overall operation control of the image forming apparatus 1. The controller 100 is connected to the document feeder 6, the document reader 5, the image forming device 12, the fixing device 13, the sheet feeder 14, the operation device 47, the network interface device 91, and the weight sensor 611 and controls the operations of these components. For example, the controller 100 controls the document feeder 6 to allow the document feeder 6 to feed one of original documents placed on the document placement tray 61 to the document reader 5 and controls the document reader 5 to allow the document reader 5 to read an image of the original document fed from the document feeder 6.

The instruction acceptor 101 accepts a user's instruction input through the operation device 47. The instruction acceptor 101 accepts respective instructions associated with hard keys provided in the operation device 47. Furthermore, the instruction acceptor 101 accepts respective instructions associated with user's gestures (touch gestures) on an operation screen displayed on the display device 473, based on a touch panel function of the display device 473.

The number-of-documents calculator 102 calculates the number N of original documents placed on the document placement tray 61 based on a preset weight (for example, 4 g) per original document from the weight of the original documents on the document placement tray 61 detected by the weight sensor 611. The controller 100 allows the document reader 5 to read the images of the original documents based on the number N of original documents calculated by the number-of-documents calculator 102 so that as the number N of original documents increases, the resolution for reading the original documents becomes predetermined lower values (that is, the time required for reading becomes shorter). For example, as the number N of original documents increases, the controller 100 allows the document reader 5 to read the images of the original documents at lower resolutions R for reading.

The determiner 103 determines, based on image data on each original document acquired by reading by the document reader 5, the type of the original document by determining whether the original document is a text document composed only of characters, an image document composed only of images or a mixed document composed of characters and images. For example, the determiner 103 detects, based on the image data, the number NE of edges contained in the original document represented by the image data. When the number NE of edges is equal to or larger than a predetermined first threshold value NE1, the determiner 103 determines that the original document is a text document. When the number NE of edges is equal to or larger than a predetermined second threshold value NE2 (<the first threshold value NE1) and less than the first threshold value NE1, the determiner 103 determines that the original document is a mixed document. When the number NE of edges is less than the second threshold value NE2, the determiner 103 determines that the original document is an image document. However, how the determiner 103 determines the type of original document is not limited to the above method and any other method may be adopted.

The special document detector 104 determines, based on image data on each original document acquired by reading by the document reader 5, whether or not the original document satisfies a predetermined condition representing that the original document is to be read preferably at a high resolution, and detects the original document satisfying the predetermined condition as a special original document to be read preferably at the high resolution. For example, the predetermined condition representing that the original document is to be read preferably at the high resolution is that the original document is an "image document". When the predetermined condition is that the original document is an "image document", the special document detector 104 detects, based on the determination result of the determiner 103, an image document as a special document to be read preferably at the high resolution.

The notifier 105 performs notification processing for notifying the user that a special document has been detected by the special document detector 104.

For image data on each original document acquired by reading by the document reader 5, its text portion is preferably subjected to enhancement processing for enhancing the edges, its image portion is preferably subjected to smoothing processing, and the image data subjected to these types of processing is preferably subjected to color conversion processing. The contents of these types of image processing are preferably changed with the resolutions at which the original documents have been read.

The image processor 106 subjects the image data on each original document acquired by reading by the document reader 5 to image processing according to the resolution at which the original document has been read and the type of the original document (text document, image document or mixed document) and based on contents predetermined resolution by resolution and type by type. Thus, if the original documents are different in document type, they are subjected to different image processing having different contents. Furthermore, if the original documents are different in resolution for reading even when they are of the same document type, they are subjected to different image processing having different contents.

Figure 3:
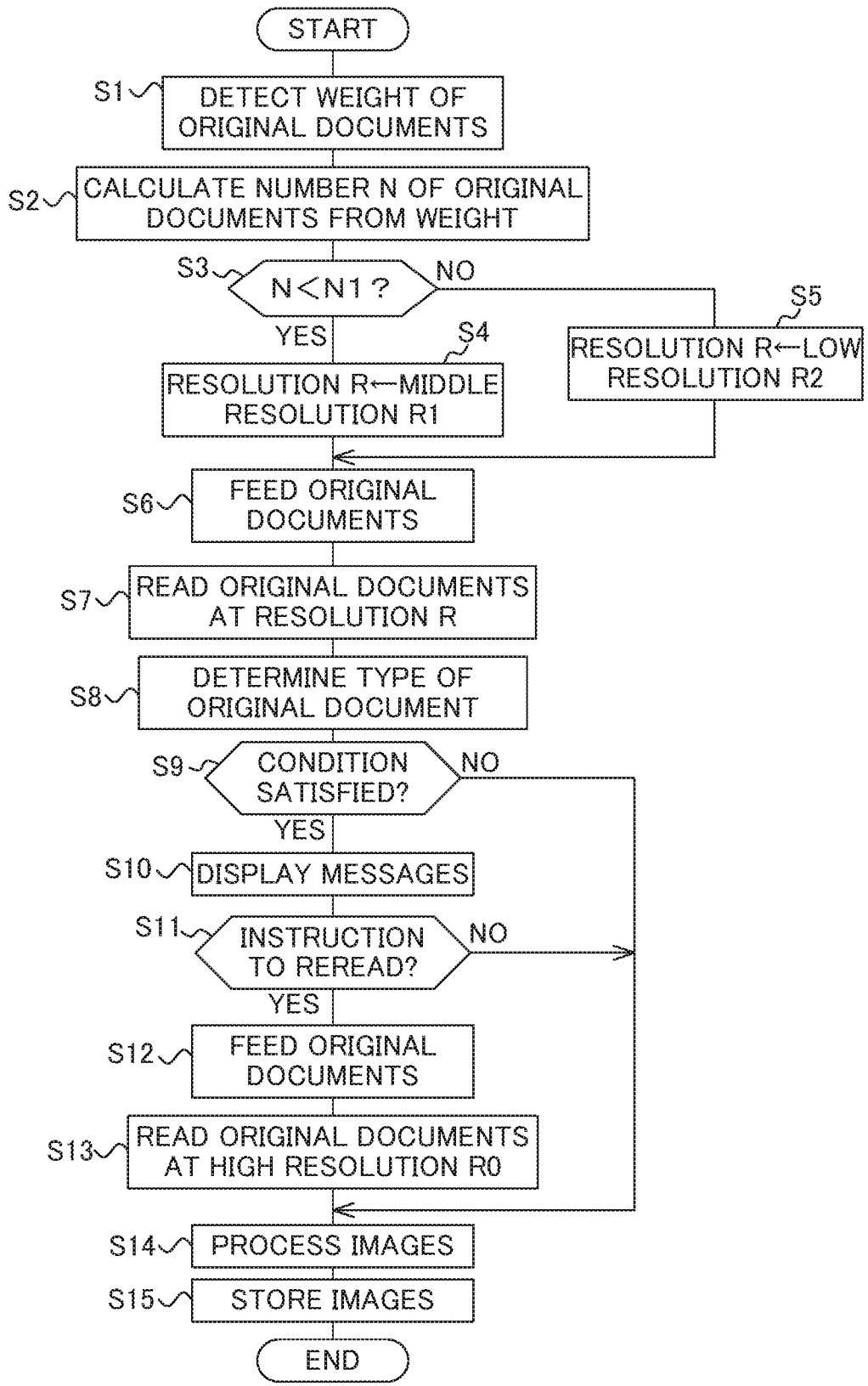
FIG. 3 is a flowchart showing original document reading processing of the image forming apparatus according to the first embodiment.

Next, a description will be given of original document reading processing of the image forming apparatus 1 according to the first embodiment. FIG. 3 is a flowchart showing the original document reading processing of the image forming apparatus 1 according to the first embodiment. This original document reading processing is executed when the instruction acceptor 101 accepts a user's instruction to "start copying".

In reading original documents, first, the controller 100 allows the weight sensor 611 to detect the weight of original documents placed on the document placement tray 61 (step S1). Subsequently, the number-of-documents calculator 102 calculates the number N of original documents placed on the document placement tray 61 from the weight detected by the weight sensor 611 (step S2) and the controller 100 determines whether or not the number N of original documents is less than a predetermined first threshold value N1 (for example, 50) (step S3).

When the controller 100 determines that the number N of original documents is less than the first threshold value N1 (YES in step S3), it sets the resolution R for reading to a predetermined middle resolution R1 (for example, 600×300 dpi) (step S4). On the other hand, when the controller 100 determines that the number N of original documents is not less than the first threshold value N1 (NO in step S3), it sets the resolution R for reading to a predetermined low resolution R2 (for example, 300×300 dpi where (the middle resolution R1)>(the low resolution R2)) (step S5).

Subsequently, the controller 100 controls the document feeder 6 to allow the document feeder 6 to start feeding all the original documents placed on the document placement tray 61 (step S6) and allows the document reader 5 to read the images of the original documents fed from the document feeder 6 at the resolution R (middle resolution R1 or low resolution R2) set in step S4 or step S5 (step S7).

Each time when the document reader 5 reads an original document, the determiner 103 determines the type of the original document by determining, based on image data on the original document acquired by reading by the document reader 5, whether the original document is a text document, an image document or a mixed document (step S8) and the special document detector 104 determines, based on the determination result of the determiner 103, whether or not the original document read by the document reader 5 satisfies a condition representing that the original document is to be read preferably at a high resolution (for example, the condition that the type of the original document is an image document) (step S9).

Figure 4:
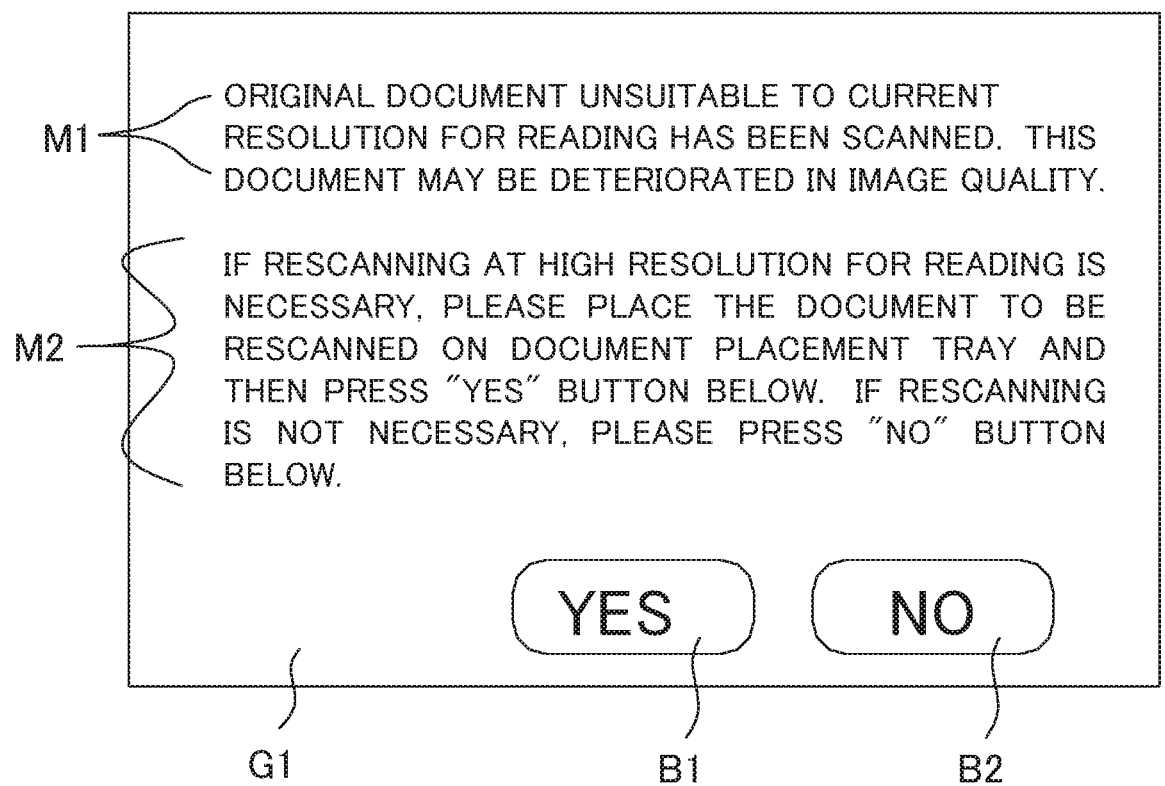
FIG. 4 is a view showing an example of an operation screen displayed on a display device.

When the special document detector 104 determines that the original document satisfies the above condition (YES in step S9), the notifier 105 controls the display device 473 to perform notification processing for notifying the user that a special original document has been detected and asking the user about whether or not to request rereading of the special original document at the high resolution (step S10). FIG. 4 is a view showing an example of an operation screen displayed on the display device 473. The notification processing is executed even during reading of an original document by the document reader 5.

The notifier 105 allows the display device 473 to display on the operation screen G1 a message M1 indicating that a special original document to be read preferably at a high resolution (an original document unsuitable to the resolution used for the current reading) has been detected, a message M2 for asking the user about whether or not to request rereading of the special original document at the high resolution, a select button B1 shown as "YES", and a select button B2 shown as "NO".

The controller 100 determines whether or not the instruction acceptor 101 has accepted a user's instruction requesting the above rereading (step S11). When, for example, the controller 100 determines, based on a touch on the select button B1 shown as "YES", that the instruction acceptor 101 has accepted the instruction requesting the above rereading (YES in step S11), the controller 100 controls the document feeder 6, after the completion of reading of all the original documents in steps S6 and S7, to allow the document feeder 6 to feed all of original documents placed on the document placement tray 61 to the document reader 5 (step S12) and allows the document reader 5 to read each of the original documents fed from the document feeder 6 to the document reader 5 at a high resolution R0 (for example, 600×600 dpi where (the high resolution R0)>(the middle resolution R1)) (step S13).

Specifically, when the user places one or more original documents needed to be reread (original documents to be read preferably at a high resolution) on the document placement tray 61 according to the message M2 displayed on the operation screen G1 and then touches the select button B1 shown as "YES", the controller 100 allows the document reader 5 to read the images of the original documents at the high resolution R0.

Subsequently, the image processor 106 subjects individual pieces of image data on the original documents acquired by reading by the document reader 5 to image processing according to the resolution at which the individual original document has been read and the type of the individual original document and based on contents predetermined resolution by resolution and type by type (step S14). Instead of subjecting all the pieces of image data on the original documents to image processing in series as in step S14, image processing may be executed, with each completion of reading of an individual original document, on the piece of image data on the original document. Thereafter, the controller 100 allows the storage device 92 to store the respective pieces of image data on all the original documents subjected to image processing by the image processor 106 (step S15). In step S15, instead of or in addition to the storage of the pieces of image data, the controller 100 may control the image forming device 12 and the sheet feeder 14 to allow them to form the images represented by the pieces of image data on recording paper sheets. Then, the processing ends.

When in step S9 the special document detector 104 determines that the original document does not satisfy the above condition (NO in step S9) or when in step S11 the select button B2 shown as "NO" has been touched and the controller 100 thus determines that the instruction acceptor 101 has accepted a user's instruction not requesting the rereading (NO in step S11), rereading at the high resolution R0 is not necessary and the processing skips to step S14.

With the use of a document feeder, a plurality of original documents can be automatically read. However, when the number of original documents is large, it takes long time to read all the original documents.

For example, there is known a general technique in which original documents placed on a document feeder are first conveyed without subsequent reading operation in order to count the number of original documents, the resolution for reading is set to a resolution decreasing with increasing number of original documents, and the original documents placed again on the document feeder are read at the set resolution. As the resolution decreases, it takes shorter time to read a single original document. Therefore, in the above general technique, by setting the resolution at a value decreasing with increasing number of original documents, the time to read the original documents can be reduced.

However, in the above general technique, it is necessary to convey the original documents twice, which may deteriorate the original documents. Furthermore, it is also necessary to place all the original documents on the document feeder again, which is troublesome for the user.

In addition, in the above general technique, when the number of original documents placed on the document feeder is large, all the original documents on the document feeder are read at a low resolution. If the stack of original documents contains an original document unsuitable to be read at the low resolution (i.e., an original document to be read preferably at a high resolution), the quality of its output image decreases.

In the first embodiment, when the number N of original documents is large, the resolution R for reading is decreased, so that the time to read the original documents can be reduced. Furthermore, when the number N of original documents is small, the resolution R for reading the original documents is increased. However, when it is determined that reading at the middle resolution R1 or the low resolution R2 is not preferred and reading at a higher resolution R0 is preferred, the user is given a notification that a special original document has been detected, as described above.

In other words, when the stack of original documents placed on the document placement tray 61 contains a special original document, the above notification is performed. For example, if the user previously specifies an "image document" as an original document to be read preferably at the high resolution R0 and the stack of original documents placed on the document placement tray 61 contains an image document, the above notification is performed.

Thus, the user can be reminded that the special original document should be reread at the high resolution R0. Specifically, it can be prevented that the special original document remains read at the middle resolution R1 or the low resolution R2 and is not reread at the high resolution R0, so that a decrease in quality of the output image can be prevented. Therefore, the time taken to read original documents can be reduced while the quality of the output images can be ensured.

The description in the first embodiment has been given of the case where: when the number N of original documents placed on the document placement tray 61 is equal to or more than the first threshold value N1, the controller 100 sets the resolution R to the low resolution R2; and when the number N of original documents is less than the first threshold value N1, the controller 100 sets the resolution R to the middle resolution R1. In another embodiment, a plurality of threshold values may be set for the number N of original documents. For example, in addition to the above-described resolution setting processing, processing for setting the resolution R to the high resolution R0 when the number N of original documents is less than a predetermined second threshold value N2 (for example, 10) may be executed.

Figure 5:
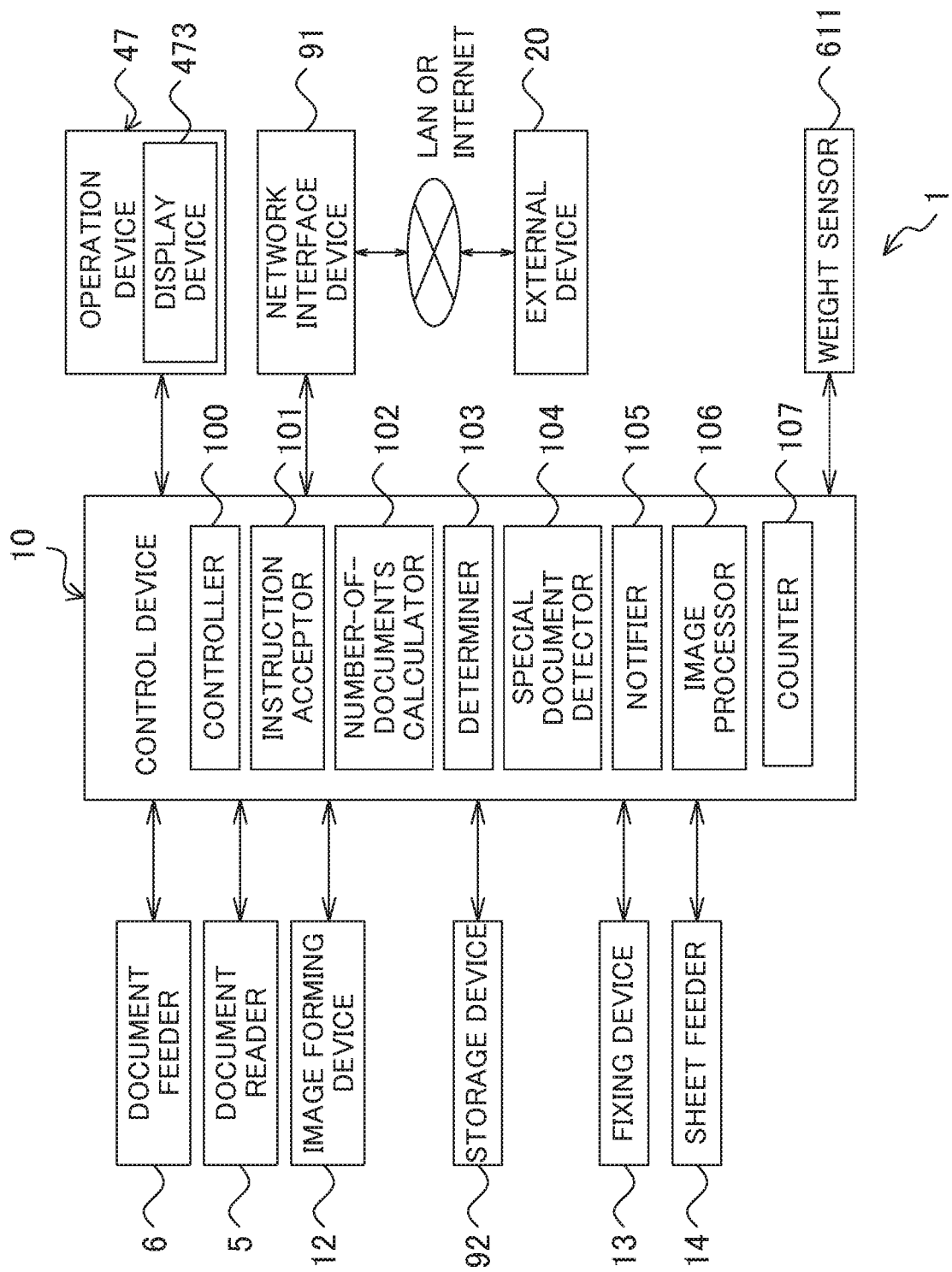
FIG. 5 is a functional block diagram schematically showing an essential internal configuration of an image forming apparatus according to a second embodiment.

FIG. 5 is a functional block diagram schematically showing an essential internal configuration of an image forming apparatus according to a second embodiment. The image forming apparatus according to the second embodiment is different from the image forming apparatus according to the first embodiment in that the control device 10 includes a counter 107. Further explanation of the same structures and configurations as in the first embodiment is omitted.

When the processor operates in accordance with a control program stored on the storage device 92, the control device 10 further functions as the counter 107. Alternatively, each of the controller 100 and the other components of the control device 10 may not be implemented by the operation of the processor in accordance with the control program, but may be constituted by a hardware circuit.

The counter 107 counts the number of times that a special original document has been detected by the special document detector 104.

Figure 6:
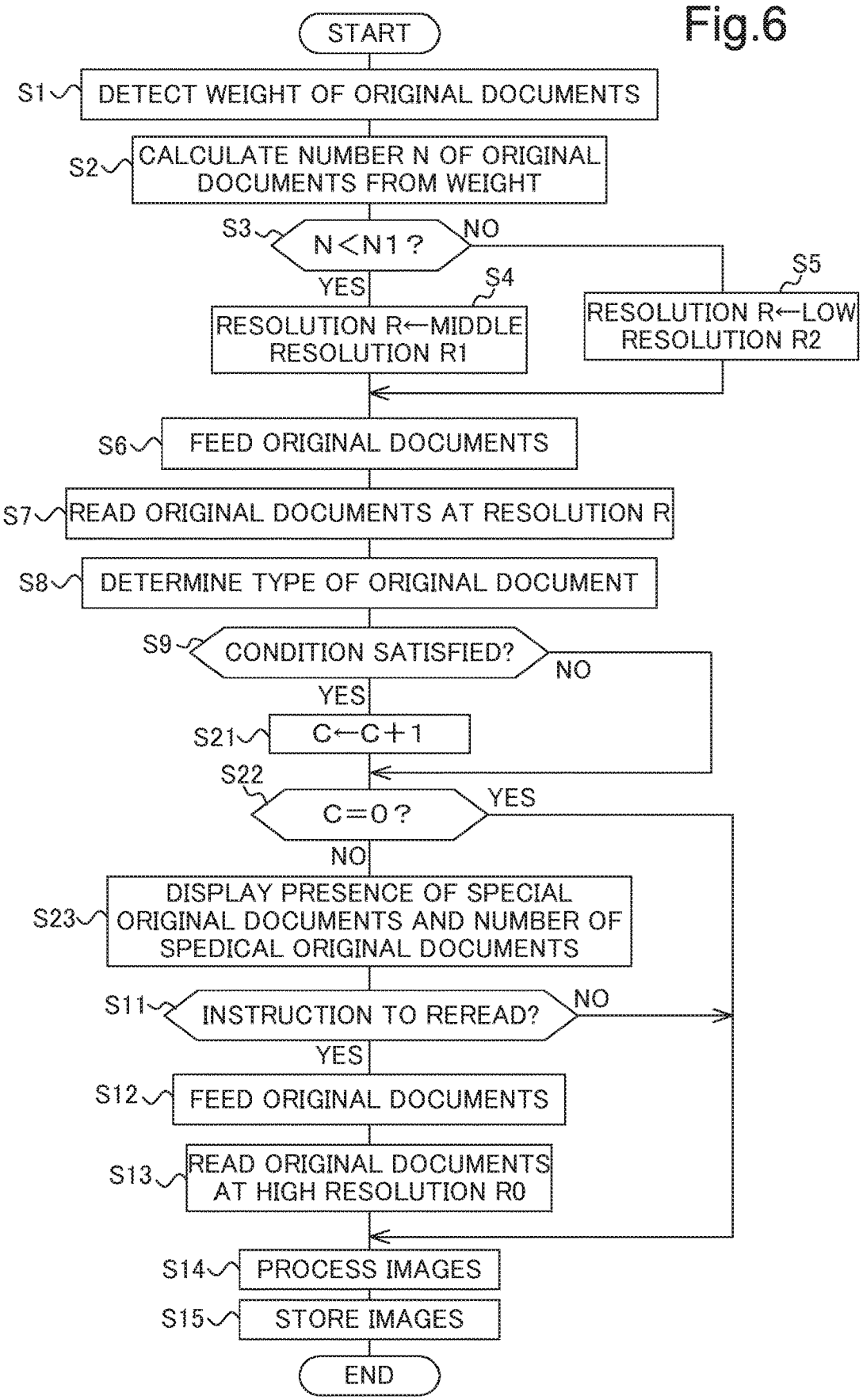
FIG. 6 is a flowchart showing original document reading processing of the image forming apparatus according to the second embodiment.

Next, a description will be given of original document reading processing of the image forming apparatus 1 according to the second embodiment. FIG. 6 is a flowchart showing the original document reading processing of the image forming apparatus 1 according to the second embodiment. However, further explanation of the same processing steps as in the flowchart shown in FIG. 3 is omitted. This processing is executed when the instruction acceptor 101 accepts a user's instruction to "start copying".

In step S9, only when the special document detector 104 determines that the original document just read by the document reader 5 satisfies the above condition and thus detects a special original document (YES in step S9), the counter 107 adds 1 to the count C (step S21). Then, the controller 100 determines whether or not the count C at this time is 0 (step S22).

When the controller 100 determines that the count C is not 0 (NO in step S22), the notifier 105 controls the display device 473 to perform notification processing for notifying the user that a special original document has been detected, notifying the user of the value of the count C as the number of special original documents, and asking the user about whether or not to request the rereading of the special original document (step S23).

On the other hand, when in step S22 the controller 100 determines that the count C is 0 (YES in step S22), the processing goes to step S14.

In the second embodiment, the user is notified of the number of special original documents (i.e., the number of original documents to be reread at a high resolution).

Therefore, in extracting original documents to be reread, the user is less likely to miss an original document to be reread.

Furthermore, in another embodiment, the counter 107 may count not only the number C of special original documents but also the number of original documents read by the document reader 5 and the notifier 105 may execute processing for detecting, based on these count values, the places of the special original documents in the order of read original documents and notifying the user of the places of the detected special original documents in the order.

The structures, configurations, and processing described in the above embodiments with reference to FIGS. 1 to 6 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image reading device comprising:
    a document reader that reads an image of an original document;
    a document feeder including a document placement tray on which the original document is to be placed, the document feeder feeding the original document placed on the document placement tray to the document reader;
    a weight sensor that detects a weight of a stack of original documents placed on the document placement tray; and
    a control device that includes a processor and functions, through the processor executing a control program, as:
    a number-of-documents calculator that calculates, based on the weight detected by the weight sensor, a number of the original documents placed on the document placement tray;
    a controller that sets a resolution for reading the original documents to a predetermined first or second resolution based on the number of the original documents calculated by the number-of-documents calculator by setting the resolution to the first resolution when the number of the original documents is less than a predetermined number or setting the resolution to the second resolution lower than the first resolution when the number of the original documents is equal to or more than the predetermined number, and allows the document reader to read the images of the original documents fed by the document feeder at the set first or second resolution;
    a special document detector that determines, based on image data on each of the original documents acquired by reading by the document reader, whether or not the original document satisfies a predetermined condition representing that the original document is to be read preferably at a third resolution higher than the first resolution, and detects the original document satisfying the predetermined condition as a special original document to be read preferably at the third resolution; and
    a notifier that performs first notification processing for notifying a user that the special original document has been detected by the special document detector.

2. The image reading device according to claim 1, wherein
    the control device further functions a counter that counts a number of times the special original document has been detected by the special document detector, and
    when the special original document is detected by the special document detector, the notifier further performs second notification processing for notifying the user of the number of times counted by the counter as a number of special original documents.

3. The image reading device according to claim 2, wherein
    the counter further counts a number of original documents read by the document reader, and
    when the special original document is detected by the special document detector, the notifier further performs third notification processing for detecting, based on the number of times that the special original document has been detected and the number of original documents, both the number of times and the number of original documents having been counted by the counter, a place of the special original document in order of the read original documents and notifying the user of the place of the detected special original document in the order of the read original documents.

4. The image reading device according to claim 1, wherein
    the control device further functions as a determiner that determines a type of the original document by determining, based on the image data on the original document acquired by reading by the document reader, whether the original document is a text document composed only of characters, an image document composed only of images or a mixed document composed of characters and images,
    the special document detector determines, based on a determination result of the determiner, whether or not the original document is of a type previously specified as the predetermined condition by the user, and
    when the special document detector determines that the original document is of the previously specified type, the special document detector detects the original document as the special original document.

5. The image reading device according to claim 4, further comprising an image processor that subjects the image data on the original document acquired by reading by the document reader to image processing according to contents predetermined based on the resolution at which the original document has been read and the type of the original document, for each resolution and each type.

6. The image reading device according to claim 1,
    further comprising an operation device through which an instruction from the user is to be input,
    wherein the control device further functions as an instruction acceptor that accepts the instruction input through the operation device, and
    when the instruction acceptor accepts an instruction from the user to reread the special original document, the controller allows the document reader to read an image of the special original document fed by the document feeder at the third resolution.

7. An image forming apparatus comprising:
the image reading device according to claim 1; and
an image forming device that forms an image on a recording medium based on the image data acquired by reading by the image reading device.

\* \* \* \* \*